June 16, 1931.  R. FURRER  1,810,825
WELDED PIPE JOINT AND METHOD OF MAKING SAME Filed Sept. 6, 1929

INVENTOR.
Rudolph Furrer
BY
ATTORNEY.

Patented June 16, 1931

1,810,825

UNITED STATES PATENT OFFICE

RUDOLPH FURRER, OF WAUWATOSA, WISCONSIN, ASSIGNOR TO A. O. SMITH CORPORATION, OF MILWAUKEE, WISCONSIN, A CORPORATION OF NEW YORK

WELDED PIPE JOINT AND METHOD OF MAKING SAME

Application filed September 6, 1929. Serial No. 390,747.

This invention relates to a welded pipe joint and has particular application to the welding of pipe sections end to end in the laying of long pipe lines such as those employed in the gas and oil industries.

The object of the invention is to provide a pipe joint which is more simple, efficient and durable and in which the welding metal is subject to tension stresses and is protected from transverse shearing stresses.

Other objects will appear hereinafter with particular reference to the embodiment illustrated in the accompanying drawings in which.

Figure 1:
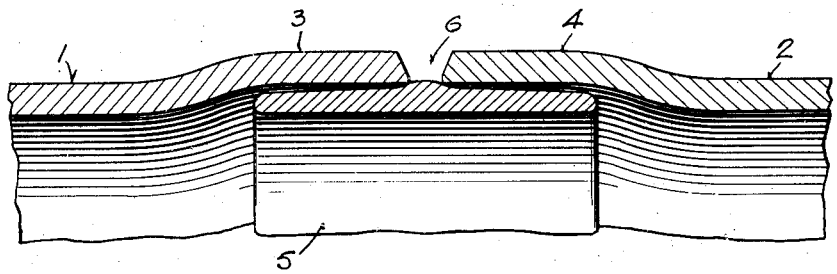
Figure 1 is a longitudinal section through the joint prior to the welding operation.

The pipes 1 and 2 to be joined have their adjacent ends belled as at 3 and 4 respectively, as shown in the drawings. A chill ring 5 is placed inside the joint and is preferably of such thinness as to maintain the predetermined required diameter of the pipe line as shown.

The chill ring is thicker at its center portion than at the edges thereof and is preferably tapered on its outer surface, as shown, to provide beveled surfaces upon which the ends of the bells 3 and 4 may be fitted. The rounded apex of the beveled surfaces of the chill ring is of such diameter as to prevent the bringing of the belled ends 3 and 4 into contact with each other. Thus the tapered surfaces of the chill ring serve to space the belled ends a predetermined amount to form a welding groove 6, as shown in Figure 1, and also to center the chill ring within the joint so that no portion thereof will obstruct the flow of fluid through the pipe line and also so that the bottom of the welding groove 6 is closed for the entire circumference of the joint.

The belled ends are preferably of such shape that the sides of the bells are substantially parallel to the longitudinal sides of the pipe and concentric therewith so that the bells contact with the chill ring only at the edges or ends of the bells as distinguished from the surface contact as would be the case where the bells are tapered outwardly to conform to the taper of the chill ring. In this way the welding groove is entirely closed at its bottom and there is no crack or opening between the bells and the chill ring.

Figure 2:
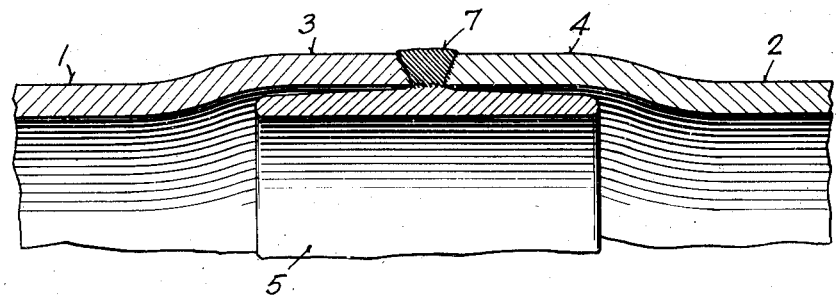
Fig. 2 is a similar section through the welded joint.
Figure 3:
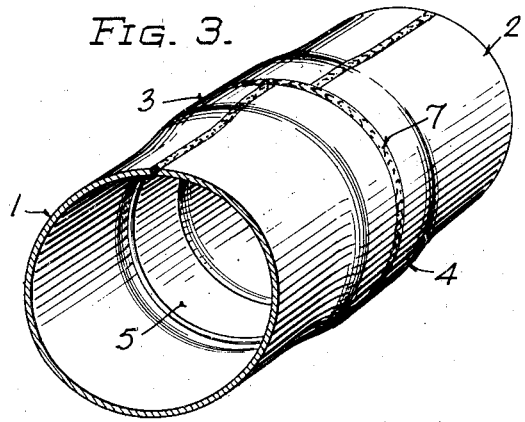
Fig. 3 is a perspective view of the pipe joint.

The joint is welded preferably by means of an electric arc and a fusible metallic weld-rod which deposits welding metal 7 in the groove 6 and fuses the ends of the bells 3 and 4 and the chill ring 5 into an integral structure, as shown in Figs. 2 and 3.

The welding metal 7 is only subject to tension stresses, as distinguished from shearing stresses, and the chill ring 5 protects the welding metal from transverse shearing stresses which might otherwise be injurious thereto.

By reason of the thinness of the chill ring, the heat of the arc will raise the temperature of the ring faster than that of the metal of the bells 3 and 4 and the consequent more rapid expansion of the ring circumferentially will aid in maintaining the welding groove 6 closed at the bottom.

I claim:

1. A pipe joint comprising two pipe sections to be joined having their adjacent ends belled, a chill ring arranged within the annular space provided by said belled ends, said chill ring being tapered outwardly to provide beveled surfaces against which the end edges only of the pipe sections are abutted to thereby space the ends of said pipe sections and center the chill ring with respect thereto, and welding metal deposited in the space between the ends of said pipe sections and joining said sections and chill ring.

2. A pipe joint comprising two pipe sections to be joined having their adjacent ends belled, a chill ring arranged within the annular space provided by said belled ends and of sufficient thinness to raise the temperature more rapidly in the welding operation than the adjacent edges of the bells, said chill ring being tapered outwardly to provide beveled surfaces against which the ends of the pipe sections abut and thereby space the ends of said pipe sections and provide a welding dam at the bottom of the space so provided and at the same time leaving a radial space between the extremities of said chill ring and the inner walls of the bells, and welding metal deposited in the space between the ends of said pipe sections and joining said sections and chill ring.

3. The method of joining pipes which comprises belling the adjacent ends of the two pipe sections to be joined, inserting a tapered chill ring in the annular space provided by said belled ends, pressing the end edges only of said pipe sections against the tapered surfaces of said chill ring to center the chill ring and pipe sections relative to each other, and depositing welding metal in the groove bounded by the adjacent ends of the pipe sections and the said chill strip.

4. A pipe joint comprising two pipe sections to be joined having their adjacent ends belled, the sides of the bells being substantially parallel and concentric to the sides of the pipe sections, a cylindrical chill ring arranged within the annular space provided by said belled ends, said chill ring being tapered outwardly to provide beveled surfaces against which the end edges only of the bells are pressed in circumferential line contact, the apex of the tapered chill ring serving to space the ends of the pipe sections and to center the chill ring with respect thereto, and fused welding metal deposited in the space between the ends of said pipe sections and welding the same and the chill ring together into an integral structure.

5. A welded joint for connecting two cylindrical metal sections end to end, comprising a ring arranged within the adjacent ends of the cylindrical sections to be joined, said ring being tapered outwardly in both directions from the central portion thereof to provide beveled surfaces against which the end edges only of the cylindrical sections are abutted to thereby center the ring with respect to the said cylindrical sections and to align the ends of said sections, and weld metal uniting said ring and adjacent ends of the cylindrical sections to form a welded joint.

6. A welded joint for connecting two cylindrical sections end to end, comprising a cylindrical chill ring arranged within the adjacent ends of the cylindrical sections to be joined, said chill ring being tapered outwardly in both directions from the central portion thereof to provide beveled surfaces against which the end edges only of the cylindrical sections are pressed in circumferential line contact, the central apex of the tapered chill ring serving to space the ends of the cylindrical sections and to center the chill ring with respect thereto, and weld metal deposited in the space between the ends of said cylindrical sections and welding the same and the chill ring together into an integral structure.

7. A welded joint for connecting two cylindrical metal sections end to end, comprising a ring arranged within the adjacent ends of the cylindrical sections to be joined, said ring having a substantially thick central circumferential portion with the outer surface thereof tapering to a less diameter toward the ends of the ring and having substantially thin end extremities thereby providing beveled outer surfaces against which the ends of the cylindrical sections are abutted in substantially circumferential line contact only, and weld metal joining said ring and adjacent ends of the cylindrical sections together.

8. A welded joint for connecting two cylindrical metal sections end to end, comprising a ring arranged within the adjacent ends of the cylindrical sections to be joined, said ring having a central portion of larger outside diameter than the end portions thereof to provide beveled outer surfaces against which the end edges only of the cylindrical sections are abutted, to thereby center the ring with respect to the cylindrical sections and to align the end edges of said sections, and weld metal uniting said ring and adjacent ends of the cylindrical sections to form a welded joint.

In witness whereof I have signed my name at Milwaukee, Wisconsin, this 3rd day of September, 1929.

RUDOLPH FURRER.